No. 729,263. Patented May 26, 1903.

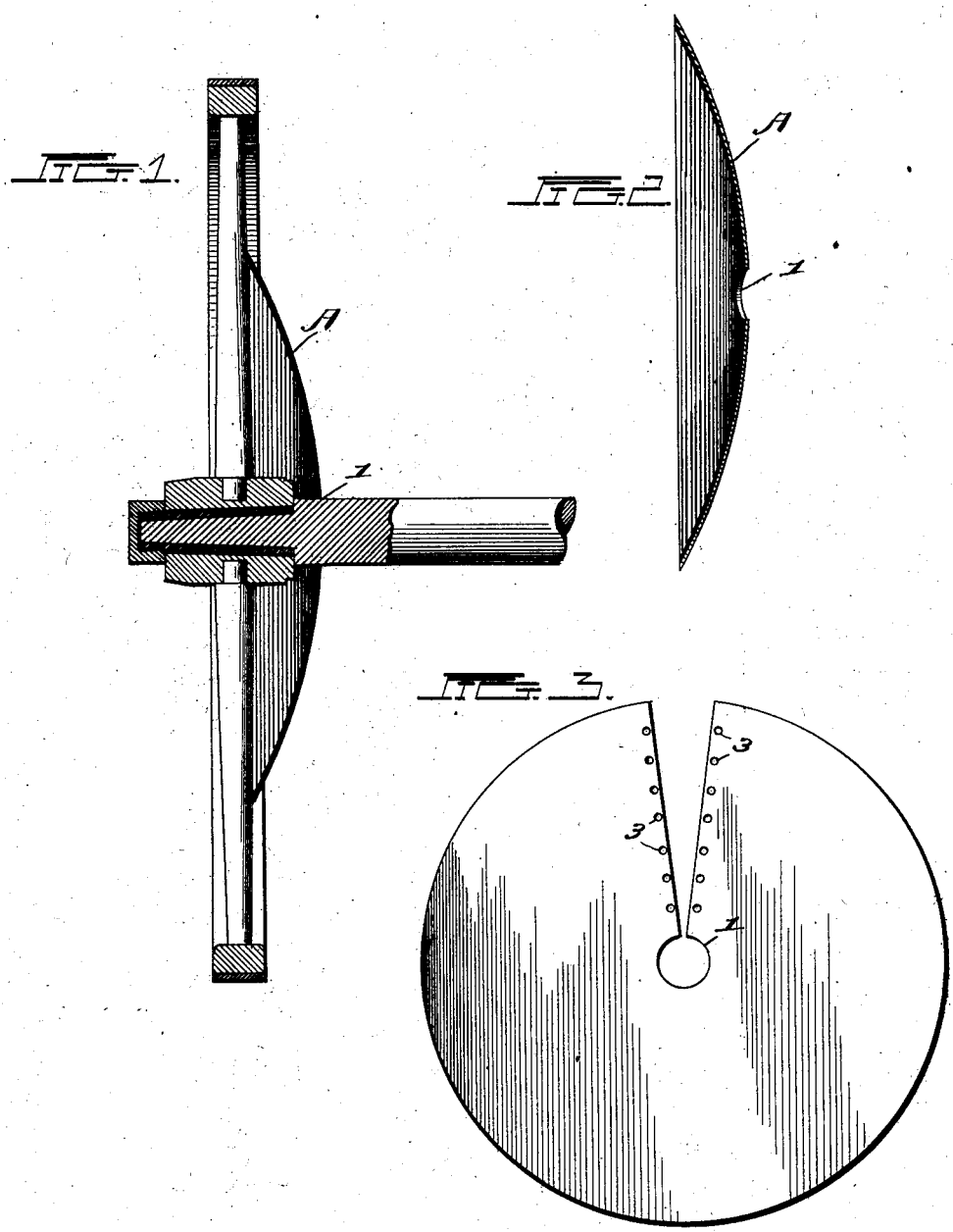

UNITED STATES PATENT OFFICE.

DANIEL BOOTHE, OF CANTON, MISSOURI.

WHEEL-FENDER.

SPECIFICATION forming part of Letters Patent No. 729,263, dated May 26, 1903.

Application filed September 6, 1902. Serial No. 122,417. (No model.)

*To all whom it may concern:*

Be it known that I, DANIEL BOOTHE, a citizen of the United States, and a resident of Canton, in the county of Lewis and State of Missouri, have invented a new and useful Improvement in Wheel-Fenders, of which the following is a specification.

My invention relates to an improvement in wheel-fenders to be used on the wheels of hay-rakes, hay-loaders, sulky-plows, and other farm implements of this nature, its object being to prevent hay, straw, or weeds being caught and roped in the hub; and my invention consists substantially in a sheet-metal disk, preferably of galvanized iron, having a central hole to receive the axle and provided with a V-shaped notch from the hole to the periphery and adapted to have the edges formed thereby riveted or otherwise secured together, whereby a concavo-convex guard or fender is formed which engages the spokes of the wheels, to which it is secured at its outer edge, embracing the axle just inside of the hub, whereby the hub is protected from material catching and winding therein.

The invention further consists in certain additional details of construction, which will be fully described in connection with the parts mentioned, and pointed out in the claim.

In the accompanying drawings, Figure 1 is a view showing my improved guard or fender applied to a wheel. Fig. 2 is a section, and Fig. 3 is a detached view, of the blank from which the guard or fender is formed.

The fender or guard comprises a disk A, of sheet metal, preferably galvanized iron—say twenty-seven inches in diameter for a four-foot wheel, varying with necessities and with the size of the wheel. This disk has a round hole 1 in the center of a size suitable to receive the axle of the hay rake, loader, or implement. A V-shaped notch is cut from this hole to the outer edge of the disk having the form of a reëntrant angle, the edges of which are cut approximately on two radii of a circle, the center of which is about coincident with the center of the disk. At the edges of this notch rivet-holes 3 3 are formed.

In the application of this device the edges of the notch may first be riveted together before applying the device to axle and then secured to the wheel, or it may be first slipped over the axle and the edges afterward riveted together. In any event when the guard or fender is in position its center embraces the axle just inside of the inner end of the hub, while the outer edge is secured to spokes of the wheel. In this way a simple and inexpensive device is provided, which at the same time is effectual in the accomplishment of the purposes required, and by its use I find that the difficulties heretofore experienced can be entirely obviated. At the same time this is a device which can be made and applied at a trifling cost and will not in any wise detract from the appearance of the machine or add anything to its weight.

It is evident that slight changes might be made in the details of construction without the departure from the spirit and scope of my invention, and hence I do not care to be limited to the precise construction shown and described; but, Having fully described my invention, what I claim as new, and desire to secure by Letters Patent, is—

The combination with an axle, and wheel, of a guard or fender of dished form engaging the wheel at its outer periphery, and the axle loosely at its center thereby forming a guard for the hub as well as the spokes of the wheel.

In testimony whereof I have signed this specification in the presence of two subscribing witnesses.

DANIEL BOOTHE.

Witnesses:
H. TRUE,
THOS. W. FURLONG.